(12) United States Patent
Tsuchiya

(10) Patent No.: US 8,376,626 B2
(45) Date of Patent: Feb. 19, 2013

(54) PIVOT ASSEMBLY BEARING

(75) Inventor: Kunihiro Tsuchiya, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 36 days.

(21) Appl. No.: 13/080,252

(22) Filed: Apr. 5, 2011

(65) Prior Publication Data

US 2011/0249922 A1    Oct. 13, 2011

(30) Foreign Application Priority Data

Apr. 8, 2010 (JP) ................................. 2010-089428

(51) Int. Cl.
*F16C 43/04* (2006.01)

(52) U.S. Cl. ........ 384/585; 384/537; 384/617; 384/620; 156/325

(58) Field of Classification Search .................. 384/490, 384/504, 537, 585, 613, 617, 619–620; 156/275.5, 156/275.7, 331.4, 325
See application file for complete search history.

(56) References Cited

U.S. PATENT DOCUMENTS

| | | | | |
|---|---|---|---|---|
| 4,018,851 A * | 4/1977 | Baccei | ............................ | 525/528 |
| 4,774,141 A * | 9/1988 | Matsui et al. | .................. | 428/414 |
| 5,250,591 A * | 10/1993 | Fujii et al. | ........................ | 523/521 |
| 5,373,407 A * | 12/1994 | Stupak et al. | ............... | 360/99.08 |
| 6,017,603 A * | 1/2000 | Tokuda et al. | .................. | 428/904 |
| 6,171,675 B1 * | 1/2001 | Iida | ................................ | 428/64.4 |
| 6,299,358 B1 * | 10/2001 | Prater et al. | ..................... | 384/537 |
| 6,562,176 B2 * | 5/2003 | Albertson et al. | .......... | 156/275.5 |
| 6,883,969 B2 * | 4/2005 | Tsuchiya et al. | ............... | 384/617 |
| 6,998,011 B2 * | 2/2006 | Schoenfeld et al. | ........ | 156/331.4 |
| 2001/0018950 A1 * | 9/2001 | Albertson et al. | .......... | 156/275.5 |
| 2002/0099138 A1 * | 7/2002 | Fujii et al. | ...................... | 525/125 |
| 2003/0156773 A1 | 8/2003 | Tsuchiya et al. | | |
| 2003/0192643 A1 * | 10/2003 | Schoenfeld et al. | ........... | 156/330 |
| 2005/0213255 A1 * | 9/2005 | Deguchi et al. | ............. | 360/265.2 |
| 2009/0180725 A1 * | 7/2009 | Galehouse et al. | ........... | 384/492 |
| 2010/0296197 A1 * | 11/2010 | Uefune et al. | .............. | 360/246.3 |

FOREIGN PATENT DOCUMENTS

| | | | |
|---|---|---|---|
| EP | 522717 A2 | * | 1/1993 |
| JP | 04266980 A | * | 9/1992 |
| JP | 2000248233 A | * | 9/2000 |
| JP | A-2003-147324 | | 5/2003 |
| JP | A-2004-137321 | | 5/2004 |
| JP | 2004315570 A | * | 11/2004 |
| JP | B2-3995490 | | 10/2007 |

* cited by examiner

*Primary Examiner* — Marcus Charles
(74) *Attorney, Agent, or Firm* — Oliff & Berridge, PLC

(57) ABSTRACT

A pivot assembly bearing having a bearing inner ring, a shaft, a bearing outer ring, a housing, and an UV curable anaerobic adhesive fixing the bearing inner ring to the shaft, and the bearing outer ring to the housing, wherein the adhesive includes 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiating agent, and in addition, a coloring agent, if necessary. The pivot assembly bearing reduces outgas, shortens adhesive curing time, and no tack at the adhesive surface is obtained.

4 Claims, 2 Drawing Sheets

PIVOT ASSEMBLY BEARING

BACKGROUND OF THE INVENTION

1. Technical Field

The present invention relates to a pivot assembly bearing used in a hard disk drive, and in particular, relates to an adhesive used in the pivot assembly bearing.

2. Background Art

A hard disk drive is one type of storage device used in computers. As shown in FIGS. 1 and 2, a hard disk drive D writes information to a magnetic disk 5 and reads the written information from the magnetic disk 5, by moving over the magnetic disk 5a magnetic head 4 arranged at the tip of an actuator 3 swingably supported by a pivot assembly bearing 1. The pivot assembly bearing 1 ordinarily has a structure in which two ball bearings are arranged between a shaft and a housing (sleeve) surrounding the shaft, and they are supported by an upper supporting part 2 and a lower supporting part (not shown).

Recently, accompanied by higher information capacity and speeding up of reading and writing, in order to correctly read and write the information recorded on a magnetic disk, it has become more important to maintain cleanliness in the hard disk drive. Therefore, a need to reduce so-called "outgas" originated from the vaporization of adhesive used in the hard disk drive, which affects the constitutional parts of the hard disk drive, has become more stringent. At the same time, a need to reduce the cost of pivot assembly bearings is also becoming more stringent.

To meet such needs, a well-known technique is to use a UV curable type anaerobic adhesive in a pivot assembly bearing for fixing a ball bearing inner ring to a shaft and a ball bearing outer ring to a housing. For example, a pivot assembly bearing which is fixed by using UV curable anaerobic adhesive having a monomer composition consisting of 80 to 96 mol % of methacrylic diester, 2 to 10 mol % of hydroxyalkylmethacrylate, and 1 to 10 mol % of acrylic acid dimer; 1 to 5 parts by weight of photopolymerizing agent per 100 parts by weight of the monomer composition; and 0.2 to 2 parts by weight of organic hydroperoxide per 100 parts by weight of the monomer composition, is disclosed (see Patent Document 1).

Patent document 1: Japanese Patent No. 3995490

However, even the pivot assembly bearing disclosed in Patent Document 1 is not sufficient to satisfy the requirement for reducing outgas and cost, which have become more stringent recently.

SUMMARY OF THE INVENTION

The present invention has been completed in view of above circumstances. An object of the present invention is to provide a pivot assembly bearing having at least a bearing inner ring fixed to a shaft or a bearing outer ring fixed to a housing by an adhesive and, as a result, the outgas generated from the adhesive is reduced, the time for curing the adhesive is shortened, and the tack of the adhesive, i.e., the stickiness of the surface of the adhesive, is reduced.

The pivot assembly bearing of the present invention has a bearing inner ring, a shaft, a bearing outer ring, a housing, and an UV curable anaerobic adhesive fixing at least the bearing inner ring to the shaft or the bearing outer ring to the housing, wherein the adhesive comprises 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiating agent, and in addition, a coloring agent, if necessary. The anaerobic adhesive has a property to remain in liquid state during in contact with air. However, it is rapidly polymerized and cured when fills a clearance between fitted metal parts or the like forming a thin film isolated from air. Furthermore, the UV curable adhesive has a property in which it is cured by irradiating ultraviolet light (UV light). The UV curable anaerobic adhesive according to the present invention has both the anaerobic and UV curable characteristics.

In the present invention, it is desirable that UV light be irradiated on excess adhesive parts which protrude from an adhered region of the bearing inner ring and the shaft and an adhered region of the bearing outer ring and the housing, to further cure the excess adhesive.

A process for production of the pivot assembly bearing of the present invention has a step of holding the bearing on a jig, a step of coating or filling the UV curable anaerobic adhesive consisting of 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiating agent, and in addition, a coloring agent, if necessary, to a predetermined part of the bearing inner ring or the shaft and the bearing outer ring or the housing, a step of assembling the parts, a step of curing the adhesive in the clearances by holding for a specified time interval, and a step of further curing the excess adhesive parts protruding from the adhered region of the bearing inner ring and the shaft and the adhered region of the bearing outer ring and housing by irradiating UV light on the protruding parts.

The pivot assembly bearing of the present invention can improve reliability of a hard disk drive (hereinafter simply referred to as HDD) by further reducing of outgas compared to the pivot assembly bearing disclosed in the Patent Document 1. Furthermore, since curing time required to obtain an adhesive strength similar to a conventional level can be shortened, the pivot assembly bearing can be produced at lower cost compared to the conventional pivot assembly bearing. Furthermore, since the protruding part of the adhesive used in the pivot assembly bearing of the present invention cures quickly without becoming a sticky surface upon irradiation of UV light, the tack is eliminated, and therefore handling is facilitated. Consequently, the subsequent operation can be processed with no waste of time, and production cost can be reduced.

EMBODIMENTS OF THE INVENTION

Figure 1:
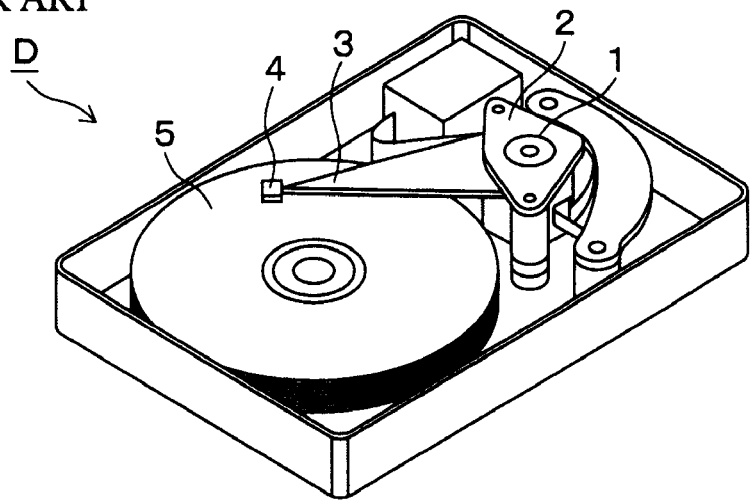
FIG. 1 is a perspective view showing a hard disk drive (HDD) having a pivot assembly bearing.
Figure 2:
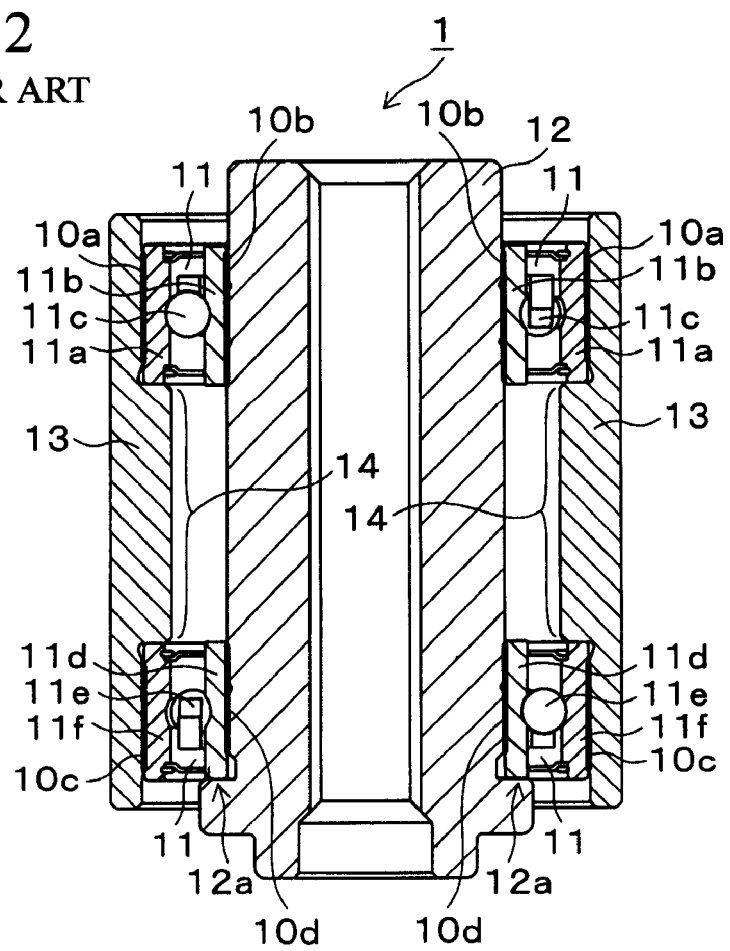
FIG. 2 is a sectional view showing a pivot assembly bearing.

FIG. 2 shows a pivot assembly bearing 1 which is a bearing device corresponding to an embodiment of the invention. The pivot assembly bearing 1 is used for swingably supporting a swing arm 3 having a magnetic head 4 for reading and writing information on a hard disk drive D shown in FIG. 1. The pivot assembly bearing 1 is used by being fitted in a through hole of swing arm block, which is not shown.

The pivot assembly bearing 1 has a shaft 12. The shaft 12 is supported in rotatable condition by two ball bearings 11, an upper one and a lower one. That is, each ball bearing 11 holds a plurality of rolling elements 11c (11e) between an inner ring 11b (11d) and an outer ring 11a (11f). The inner rings 11b and lid are fixed to an outer circumference of the shaft 12, and the outer rings 11a and 11f are fixed to inside the housing 13, which is a cylindrical body. Furthermore, a lubricant such as lubricating grease, lubricating oil or the like is filled in the space between the inner ring 11b (11d) and the outer ring 11a (11f) and around the rolling element 11c (11e).

The shaft 12 has a lower end side (downward of the figure) and an upper end side (upward of the figure). A flange 12a having an outer diameter size smaller than an inner diameter of the housing 13 is formed at the lower end side of the shaft 12 which is fixed to a lower supporting part (not shown) arranged at the base of the hard disk drive D. The outer diameter of the flange 12a should have a size in which a preload can be applied the inner ring lid is abutted. However, since material would be needlessly wasted if the size is too large, it is preferred that the size be the same as the outer diameter size of the inner ring lid or slightly larger.

To locate the two upper and lower ball bearings 11 separated apart in axial direction, a spacer 14 between the outer rings 11a and 11f is arranged in the inner circumferential surface of the housing 13. It should be noted that the housing 13 and spacer 14 of the present invention is not limited to the part that is integrally formed as shown in FIG. 2, instead they can also be made as separated parts.

Hereinafter an example of steps of assembling of pivot assembly bearing 1 is explained. First, the UV curable anaerobic adhesive of the present invention is coated on the outer circumferential surface of the lower end side of the shaft 12. Next, the ball bearing 11 is inserted in clearance fit condition from the upper end side of the shaft 12, and the end surface of the inner ring lid of the ball bearing 11 is contacted to the flange 12a. So that excess amount of the adhesive do not protrude, a circular groove to capture the excess adhesive is arranged adjacent to the flange 12a. Since the adhesive existing in the clearance between the inner ring lid and the lower end side outer circumferential surface of the shaft 12 is isolated from air, it begins to be cured. In this way, the adhered region 10d, indicated in FIG. 2 by a bold line, is bonded, and thus a first intermediate unit consisting of one ball bearing 11 fixed to the lower end part of the shaft 12 is obtained.

Next, the UV curable anaerobic adhesive of the present invention is also coated on the inner circumferential surface of the upper end side of the housing 13 which is facing the upper end side outer circumferential surface of the shaft 12. Then, the ball bearing 11 is inserted in clearance fit condition from the upper end side of the housing 13, and the end surface of the outer ring 11a of the ball bearing 11 is contacted to the spacer 14 arranged in the inner circumferential surface of the housing 13. So that excess amount of the adhesive do not protrude, a circular groove to capture the excess adhesive is arranged at an inner circumferential surface of the housing 13. Since the adhesive existing in the clearance between the outer ring 11a and the lower end side outer circumferential surface of the housing 13 is isolated from air, it begins to be cured. In this way, an adhered region 10a is bonded, and thus a second intermediate unit consisting of one ball bearing 11 fixed to the inside of the housing 13 is obtained.

Next, the UV curable anaerobic adhesive of the present invention is also coated on the V-groove arranged on the outer circumferential surface of the shaft 12 upper end side of first intermediate unit, and to the inner circumferential surface of the housing 13 lower end side of second intermediate unit. Next, the first intermediate unit is inserted into the inside of the second intermediate unit from the lower side of FIG. 2. At this time, the inner ring 11b of the upper ball bearing is fitted with clearance by inserting from the upper end side of the shaft 12, and the outer ring 11f of the lower ball bearing is also fitted with clearance by inserting from the lower end side inner circumferential surface of the housing 13, so that the upper side end surface of the outer ring 11f contacts the spacer 14. In this way, adhered regions 10b and 10c are adhered.

Finally, since excess adhesive protruding from the clearance between the inner ring 11b of the upper ball bearing and the upper end side outer circumferential surface of the shaft 12 is not cured because of the contact with air, UV light is irradiated for curing it. Thus, the pivot assembly bearing 1 shown in FIG. 2 is obtained.

The UV curable anaerobic adhesive used in the pivot assembly bearing of the present invention has 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiating agent, and in addition, coloring agent, if necessary, and in particular, as shown in the following Examples, the adhesive composition having 20% of urethane acrylate, 46% of acrylic acid diester, 2% of acrylic acid monomer, 28% of hydroxyalkylmethacrylate, 2% of anaerobic catalyst, and 2% of photopolymerization initiating agent (coloring agent can be added, if necessary) is more desirable since tack and outgas are significantly reduced.

A reason for using the UV curable anaerobic adhesive having the above composition in the present invention is because in addition to the small amount of outgas generated, the curing time of the adhesive to obtain proper adhesive strength can be greatly shortened and the tack is eliminated.

Figure 3:
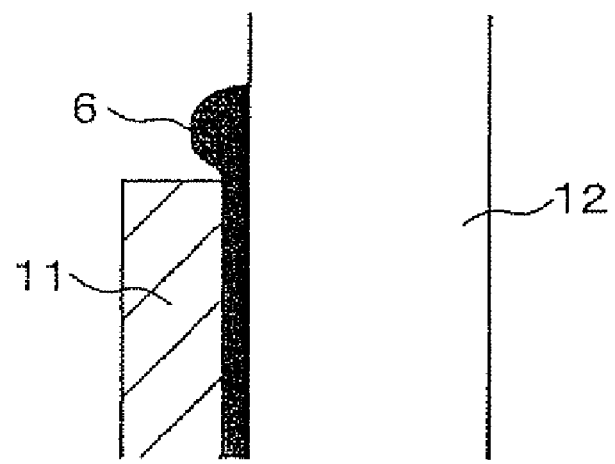
FIG. 3 is an explanatory view showing a protruding part of adhesive.

In the present invention, after assembling the pivot assembly bearing, the adhesive was cured keeping in place for predetermined periods because of its anaerobic property, and furthermore, UV light was irradiated to cure the excess adhesive. The excess adhesive means, for example, as shown in FIG. 3, a protruding part 6 of the adhesive existing between the inner ring 11b of the upper ball bearing and the upper end side outer circumferential surface of the shaft 12. As a result, an adhesive part not completely cured was eliminated, and the tack and outgas were greatly reduced. In addition, the curing time to obtain a proper adhesive strength was greatly shortened allowing the pivot assembly bearing be produced in shorter time.

The UV curable anaerobic adhesive used in the present invention has the above-mentioned compositions, and furthermore, has a glass transition temperature not less than 120° C. The reason for requiring the glass transition temperature of not less than 120° C. is because a gas purging process in which the pivot assembly bearing is heated to about 100 to 110° C. after the adhesive is completely cured, becomes possible to be performed for the purpose of reducing the generation of outgas. If the glass transition temperature is less than 120° C., the adhesive strength may be adversely affected by the gas purging process because it is too close to the heating temperature. It should be noted that the UV curable anaerobic adhesive used in the present invention can contain any known curing accelerators, stabilizers or the like, if necessary.

The protruding part 6 can be cured basically by irradiating UV light however, an protruding part existing in a closed space cannot be cured by UV light. Since monomer exists in the uncured part of the adhesive, the monomer may release outgas, the outgas may be absorbed at the surface of the recording medium (magnetic disk) thereby causing not only corrosion of the magnetic disk, but in a high density magnetic disk also it can be a direct cause of malfunction. Therefore, in order to reduce the protruding part in the closed space to a minimum level, a circular groove to capture the excess adhesive is provided. Furthermore, by controlling the amount of the adhesive, the protruding part in the closed space can be further reduced.

A summary of the embodiment of the invention follows.
(1) The pivot assembly bearing having a bearing inner ring, a shaft, a bearing outer ring, a housing, and an UV curable anaerobic adhesive fixing the bearing inner ring and the shaft, and the bearing outer ring and the housing, wherein the adhesive consists of 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiating agent, and in addition coloring agent, if necessary.
(2) The pivot assembly bearing according to the above feature, in which the UV curable anaerobic adhesive of the above composition is used, and UV light is irradiated to further curing the excess adhesive.

EXAMPLES

The present invention is further explained in detail by way of following Examples and Comparative Examples. Hereinafter, Tg means glass transition temperature.

Example 1

Preparation of UV Curable Anaerobic Adhesive Having Tg 120° C.

20% of urethane acrylate, 46% of acrylic acid diester, 2% of acrylic acid monomer, 28% of hydroxyalkyl methacrylate, 2% of anaerobic catalyst, 2% of photopolymeriation initiating agent were mixed, and coloring agent, polymerization accelerator and stabilizer were further mixed in necessary amount to obtain an adhesive composition which makes a polymer with Tg 120° C. in an anaerobic atmosphere.

Application to Pivot Assembly Bearing and Primary Curing

Preparing a pair of bearings and a housing for pivot assembly, they were assembled by coating the adhesive of Example 1 on four coating parts 10a to 10d as shown in FIG. 2 using a nozzle. The pivot assembly bearing assembled was kept in an ambient at 25° C. for 15 minutes.

Application to Pivot Assembly Bearing and Secondary Curing

UV light corresponding to 2000 mJ/cm$^2$ was irradiated on the pivot assembly bearing that had been kept at 25° C. for 15 minutes. During this step, as shown in FIG. 3, the protruding part 6 protruding from the upper part of the pivot assembly bearing was irradiated with UV light to be completely cured.

Comparative Example 1

Preparation of UV Curable Anaerobic Adhesive Having Tg 140° C.

Organic hydroperoxide, photopolymerization initiating agent, polymerization accelerator and stabilizer were further added to a composition having monomer ratio of 85 mol % of methacrylic acid diester (epoxydimethacrylate), 10 mol % of hydroxyalkyl methacrylate and 5 mol % of acrylic acid dimer, to obtain an adhesive composition which makes a polymer of Tg 140° C. in an anaerobic atmosphere.

Application to Pivot Assembly Bearing and Primary Curing

In preparing a pair of bearings for pivot assembly and a housing, they were assembled by coating the adhesive of Comparative Example 1 on coating parts 10a to 10d, shown in FIG. 2, using a nozzle. The pivot assembly bearing assembled was placed in an atmosphere at 25° C. for 15 minutes.

Application to Pivot Assembly Bearing and Secondary Curing

UV light corresponding to 2000 mJ/cm$^2$ was irradiated on the pivot assembly bearing that had been kept at 25° C. for 15 minutes. During this step, as shown in FIG. 3, the protruding part 6 protruded from the upper part of the pivot assembly bearing was irradiated with UV light to be completely cured.

Testing of Outgas Property and Surface Tack Property

Using the adhesive of Example 1 and Comparative Example 1, tests concerning the outgas property and the surface tack property were performed as described in the following method. The results are shown in Table 1.

Outgas property: After sufficiently curing the adhesive used, quantitative analysis of the amount of gas generated by heating at 85° C. for 3 hours was performed by gas chromatography to measure the amount of outgas generated per 1 g of the adhesive.

Surface tack property: The adhesive was coated on surface of a metallic plate material, UV light was irradiated in an atmosphere at 25° C., and the condition of the cured surface was observed by microscope.

TABLE 1

| | Tg (° C.) of adhesive | Amount of outgas generated | Surface tack property |
|---|---|---|---|
| Example 1 | 120(° C. | 19.4 μg | Surface of adhesive was hardened, there was no stickiness. |
| Comparative Example 1 | 140(° C. | 31.6 μg | There were non-hardened part on the surface of adhesive, and stickiness. |

As shown in Table 1, in the pivot assembly bearing of Example 1, the amount of outgas generated from the adhesive was reduced 38.5% compared to the pivot assembly bearing of Comparative Example 1. Furthermore, UV light was irradiated on each of the adhesives used in the pivot assembly bearings of Example 1 and Comparative Example 1, and conditions of the adhesive surfaces after irradiation was observed by microscope. As a result, the surface of the adhesive of Example 1 was completely cured and there was no tack (stickiness), whereas the surface of the adhesive of Comparative Example 1 had a layer in which the surface was not completely cured. Therefore, the surface tack property of the adhesive of Example 1 was superior compared to that of Comparative Example 1.

Since the layer of Comparative Example 1 in which the surface was not completely cured may cause outgas by releasing volatile components, the amount of outgas in the pivot assembly bearing of Example 1 was greatly reduced not only due to the composition of the adhesive, but also due to the improvement of surface tack property.

Testing of Adhesive Strength

Each of the adhesives of Example 1 and Comparative Example 1 was coated on respective pivot assembly bearings to assemble them. Each pivot assembly bearing was measured using a measuring jig at 25° C. every 5 minutes. The measuring jig was constructed so that the pivot assembly bearing can be arranged onto a concave groove having an inner diameter slightly greater than the outer diameter of the shaft flange of the bearings of Example 1 and Comparative Example 1 and onto another concave groove of a base part having a load cell on its bottom surface, and so that a force can be applied from an upper part of the shaft of the pivot assembly bearing. The force applied from the upper part of the shaft causing the separation of the inner ring and the shaft was measured and considered as the adhesive strength. The results are shown in Table 2.

TABLE 2

|  | 5 minutes later | 10 minutes later | 15 minutes later | 8 hours later |
|---|---|---|---|---|
| Example 1 | 392N | 666N | 804N | 1030N |
| Comparative Example 1 | 90N | 384N | 470N | 785N |

As shown in Table 2, the adhesive strength of Example 1 after 15 minutes of bonding of the shaft and the bearing was 804 N, whereas that of Comparative Example 1 was only 470 N. Furthermore, the adhesive strength of the pivot assembly bearing of Example 1 was 392 N after 5 minutes, whereas it took more than 10 minutes for the Comparative Example to reach the same level. That is, adhesive hardening time to obtain the same adhesive strength of the pivot assembly bearing of Example 1 was about half of that of the Comparative Example 1. Thus, the assembled product can proceed to the subsequent operation more quickly.

As is clear from the results of Tables 1 and 2, the surface of the adhesive after irradiation of UV light is completely cured in the pivot assembly bearing of the present invention. As a result, outgas generated from adhesive can be greatly reduced compared to a conventional pivot assembly bearing, and reliability of a hard disk drive can be improved. Furthermore, since curing time required for obtaining the same adhesive strength as a conventional one can be shortened, productivity is improved compared to a conventional pivot assembly bearing, and a low-cost pivot assembly bearing can be provided. Thus, the practical effect of present invention is considerable.

The present invention can be utilized in various kinds of products such as a pivot assembly bearing, a hard disk drive using the pivot assembly bearing, and the like.

EXPLANATION OF REFERENCE NUMERALS

1 . . . Pivot assembly, bearing,
10a, 10c . . . Adhered region of bearing outer ring and housing,
10b, 10d . . . Adhered region of bearing inner ring and shaft,
11 . . . Ball bearing,
11a, 11f . . . Bearing outer ring,
11b, 11d . . . Bearing inner ring,
12 . . . Shaft,
12a . . . Flange part,
13 . . . Housing,
14 . . . Spacer,
2 . . . Upper supporting part,
3 . . . Head actuator,
4 . . . Magnetic head,
5 . . . Magnetic disk,
6 . . . Protruding part of adhesive,
D . . . Hard disk drive.

What is claimed is:

1. A pivot assembly bearing comprising:
a bearing inner ring,
a shaft,
a bearing outer ring,
a housing, and
an UV curable anaerobic adhesive fixing at least the bearing inner ring to the shaft or the bearing outer ring to the housing,
wherein the adhesive comprises 15 to 25% of urethane acrylate, 45 to 55% of acrylic acid diester, less than 3% of acrylic acid monomer, 15 to 30% of hydroxyalkylmethacrylate, less than 3% of anaerobic catalyst, and less than 3% of photopolymerization initiator.

2. The pivot assembly bearing according to claim 1, wherein UV light is irradiated on excess adhesive that protrudes from at least an adhered region of the bearing inner ring and the shaft or an adhered region of the bearing outer ring and the housing, to cure the excess adhesive.

3. The pivot assembly bearing according to claim 2, wherein the adhesive further comprises a coloring agent.

4. The pivot assembly bearing according to claim 1, wherein the adhesive further comprises a coloring agent.

* * * * *